US009844007B2

(12) United States Patent
Harada et al.

(10) Patent No.: US 9,844,007 B2
(45) Date of Patent: Dec. 12, 2017

(54) RADIO BASE STATION, USER TERMINAL AND RADIO COMMUNICATION METHOD

(71) Applicant: NTT DOCOMO, INC., Tokyo (JP)

(72) Inventors: Hiroki Harada, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 22 days.

(21) Appl. No.: 14/908,961

(22) PCT Filed: Jun. 23, 2014

(86) PCT No.: PCT/JP2014/066517
§ 371 (c)(1),
(2) Date: Jan. 29, 2016

(87) PCT Pub. No.: WO2015/015950
PCT Pub. Date: Feb. 5, 2015

(65) Prior Publication Data
US 2016/0174169 A1 Jun. 16, 2016

(30) Foreign Application Priority Data
Aug. 2, 2013 (JP) ................................. 2013-161010

(51) Int. Cl.
*H04W 52/32* (2009.01)
*H04W 16/32* (2009.01)
(Continued)

(52) U.S. Cl.
CPC ......... *H04W 52/325* (2013.01); *H04W 16/32* (2013.01); *H04W 52/44* (2013.01);
(Continued)

(58) Field of Classification Search
CPC . H04W 16/32; H04W 52/143; H04W 52/244; H04W 52/325; H04W 52/362;
(Continued)

(56) References Cited

U.S. PATENT DOCUMENTS

| 8,200,271 B2* | 6/2012 | Baker | H04W 52/44 370/318 |
| 2001/0024431 A1* | 9/2001 | Koo | H04B 7/264 370/335 |

(Continued)

OTHER PUBLICATIONS

European Search Report issued in corresponding European Application No. 14831809.0, dated Feb. 16, 2017 (9 pages).

(Continued)

*Primary Examiner* — Robert Lopata
(74) *Attorney, Agent, or Firm* — Osha Liang LLP

(57) ABSTRACT

The present invention is designed to allow user terminals to detect small cells in the off state efficiently when the small cells are switched on and off dynamically. A radio base station that switches between a continuous transmission state and a discontinuous transmission state dynamically, has a power control section that executes power control so that the transmission power of a reference signal for cell detection that is transmitted in the discontinuous transmission state is lower than the transmission power of a reference signal that is transmitted in the continuous transmission state.

9 Claims, 13 Drawing Sheets

(51) Int. Cl.

| | | |
|---|---|---|
| *H04W 52/44* | (2009.01) | |
| *H04W 52/50* | (2009.01) | |
| *H04W 76/04* | (2009.01) | |
| *H04W 52/14* | (2009.01) | |
| *H04W 52/24* | (2009.01) | |
| *H04W 52/36* | (2009.01) | |

(52) U.S. Cl.
CPC ......... *H04W 52/50* (2013.01); *H04W 76/048* (2013.01); *H04W 52/143* (2013.01); *H04W 52/244* (2013.01); *H04W 52/362* (2013.01)

(58) Field of Classification Search
CPC ... H04W 52/44; H04W 52/50; H04W 76/048; H04W 84/18; H04L 41/04; H04L 41/085; H04L 41/12; H04L 45/02
USPC .......................................................... 370/254
See application file for complete search history.

(56) References Cited

U.S. PATENT DOCUMENTS

| | | | | |
|---|---|---|---|---|
| 2003/0224836 | A1* | 12/2003 | Tsai | H04L 1/0001 455/573 |
| 2006/0256757 | A1* | 11/2006 | Kuusela | H04W 76/048 370/335 |
| 2007/0207827 | A1* | 9/2007 | Bi | H04W 52/12 455/522 |
| 2008/0316950 | A1* | 12/2008 | Damnjanovic | H04W 52/146 370/311 |
| 2008/0317159 | A1* | 12/2008 | Moulsley | H04L 27/0008 375/295 |
| 2009/0280819 | A1 | 11/2009 | Brisebois et al. | |
| 2010/0048212 | A1 | 2/2010 | Yavuz et al. | |
| 2010/0309833 | A1* | 12/2010 | Liu | H04B 1/7097 370/311 |
| 2014/0098726 | A1* | 4/2014 | Kang | H04W 52/545 370/311 |

OTHER PUBLICATIONS

International Search Report issued in PCT/JP2014/066517 dated Sep. 9, 2014 (1 page).

3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

Qualcomm Incorporated; "Small cell discovery"; 3GPP TSG-RAN WG1 #72bis, R1-131408; Chicago, IL, USA; Apr. 15-19, 2013 (3 pages).

* cited by examiner

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In a UMTS (Universal Mobile Telecommunications System) network, the specifications of long-term evolution (LTE) have been drafted for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single-Carrier Frequency Division Multiple Access) is used in uplink channels (uplink).

Successor systems of LTE (referred to as, for example, "LTE-advanced" or "LTE enhancement" (hereinafter referred to as "LTE-A")) have been under study for the purpose of achieving further broadbandization and increased speed beyond LTE. In the LTE-A system, a HetNet (Heterogeneous Network), in which small cells (for example, pico cells, femto cells and so on), each having a local coverage area of a radius of approximately several tens of meters, are formed inside a macro cell having a wide coverage area of a radius of approximately several kilometers, is under study (see, for example, non-patent literature 2). In relationship to the HetNet, a study is also in progress to use carriers of different frequency bands, in addition to carriers of the same frequency band, between the macro cell and the small cells.

CITATION LIST

Non-Patent Literature

Non-Patent Literature 1: 3GPP TS 36.300 "Evolved UTRA and Evolved UTRAN Overall Description"
Non-Patent Literature 2: 3GPP TR 36.814 "E-UTRA Further Advancements for E-UTRA Physical Layer Aspects"

SUMMARY OF INVENTION

Technical Problem

In the above HetNet, many small cells may be placed in the macro cell. In relationship to this HetNet, a study is in progress to switch each small cell on and off, dynamically, depending on the fluctuations of traffic over time. In this case, to allow a small cell to smoothly transition from on to off, a user terminal needs to detect the small cell in the off state in an efficient manner.

The present invention has been made in view of the above, and it is therefore an object of the present invention to provide a radio base station, a user terminal and a radio communication method which can be controlled so that, when small cells are switched on and off dynamically, user terminals can detect the small cells in the off state in an efficient manner.

Solution to Problem

A radio base station, according to the present invention, provides a radio base station that switches between a continuous transmission state and a discontinuous transmission state dynamically, and this radio base station has a power control section that executes power control so that the transmission power of a reference signal for cell detection that is transmitted in the discontinuous transmission state is lower than the transmission power of a reference signal that is transmitted in the continuous transmission state.

Technical Advantage of the Invention

According to the present invention, when small cells are switched on and off dynamically, user terminals can detect the small cells in the off state in an efficient manner.

DESCRIPTION OF EMBODIMENTS

Figure 1:
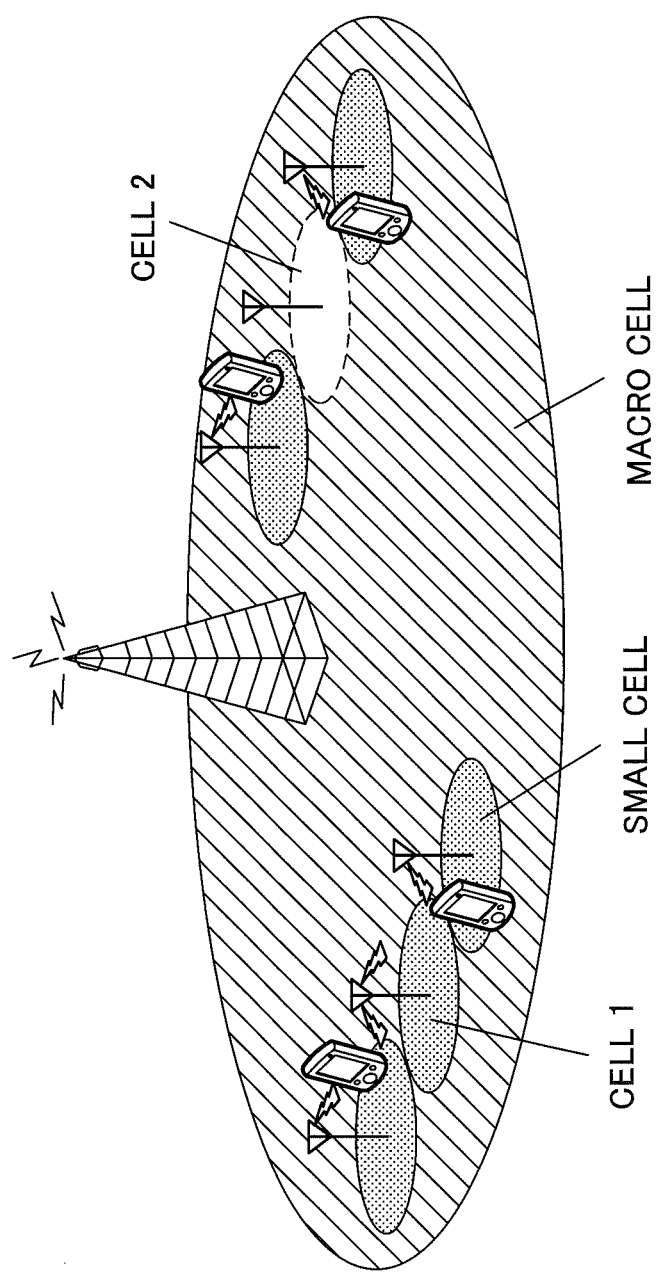
FIG. 1 is a conceptual diagram of a HetNet.

FIG. 1 is a conceptual diagram of a HetNet that is anticipated in Rel. 12 and later versions. As illustrated in FIG. 1, a HetNet refers to a radio communication system in which macro cells and small cells are arranged to geographically overlap each other at least in part. A HetNet is comprised of a radio base station that forms a macro cell (hereinafter referred to as "macro base station"), radio base stations that form small cells (hereinafter referred to as "small base stations"), and user terminals that communicate with the macro base station and the small base stations.

Generally speaking, the distribution of users and traffic are not fixed, but change over time or between locations. Consequently, when many small cells are placed in a macro cell, the small cells may be placed in such a manner that their density and environment vary (sparse and dense) between locations, as illustrated in FIG. 1. For example, it may be possible to raise the density of placing small cells (dense small cells) in train stations, shopping malls and so on where many user terminals gather, and lower the density of placing small cells (sparse small cells) in places where user terminals do not gather.

For example, by placing small cells densely and in a localized manner—that is, in clusters—in places where the traffic is heavy, it is possible to achieve an off-loading effect between the cells. Furthermore, since it is not necessary to cover the whole area (the macro cell's coverage area) with the small cells, it becomes possible to control the locations to place the small cells and the number of small cells, taking into account the cost and so on.

In the HetNet illustrated in FIG. 1, the macro cell uses a carrier of a relatively low frequency band such as, for example, 800 MHz and 2 GHz (hereinafter referred to as the "low frequency band carrier"). The use of the low frequency band carrier allows the macro cell to assume a wide coverage easily and operate in frequencies that allow connection to existing user terminals (Rel. 8 to 11). By this means, the macro cell can cover a wide range area as a cell where all user terminals stay connected at all times.

In the HetNet illustrated in FIG. 1, a plurality of small cells use a carrier of a relatively high frequency band such as, for example, 3.5 GHz (hereinafter referred to as the "high frequency band carrier"). The use of the high frequency band carrier allows the small cells to use a wide band, so that highly efficient data off-loading in a best-effort model becomes possible. Consequently, the small cells are placed in a localized manner as off-loading cells for user terminals in heavy-traffic areas.

In the HetNet illustrated in FIG. 1, the connection between the macro cell (macro base station) and the small cells (small base station) is established via a backhaul link. To be more specific, operation is assumed here where the macro base station and the small base stations coordinate via a backhaul link and where the macro base station assists the small base stations (operation in which the small base stations are dependent on the macro base station). In this operation in which the macro base station assists the small base stations, for example, the macro base station reports small base station detection information or control information to user terminals, the macro base station applies carrier aggregation (in the event different frequencies are used) to add the small cells of small base stations, or coordinated multi-point communication (in the event the same frequency is used), to the terminals connected to the macro cell, and so on.

Also, between a plurality of small base stations, too, connection may be established via a backhaul link. The connection between the macro base station and the small base stations or the connection between the small base stations may be established with wire connection using optical fiber, non-optical fiber (X2 interface) and so on.

In Rel. 12, a study in progress to switch a small cell on and off in accordance with the fluctuations of traffic over time. In the present description, the on state of small cells means the continuous transmission state, and the off state means the discontinuous transmission state ((DTX: Discontinuous Transmission) state).

In the example illustrated in FIG. 1, a cell 1 stays in the on state despite the fact that there is no traffic. Since small cells in the on state transmit reference signals such as cell-specific reference signals (CRSs: Cell-specific Reference Signals), there is a problem that the interference against nearby cells and the overall network power consumption grow. Meanwhile, in the example illustrated in FIG. 1, a cell 2 has switched to the off state because there is no traffic. In this case, it is possible to reduce the interference against nearby cells due to reference signal transmission and furthermore save the power that is consumed in the network.

The effects of saving network power consumption and reducing interference are maximized by controlling small cells on and off dynamically. When small cells are controlled on and off dynamically, the transition from on to off may be decided by monitoring traffic from the network side.

On the other hand, the transition from off to on needs to be carried out by identifying the traffic that is produced in off-state small cell areas. To realize this, a method is under study whereby a small cell in the off state transmits a specific downlink reference signal discontinuously (DTX: Discontinuous Transmission), and, based on the result which a user terminal connected to the macro cell and detecting this signal reports, whether or not to let this small cell transition to the on state is decided.

Figure 2A:
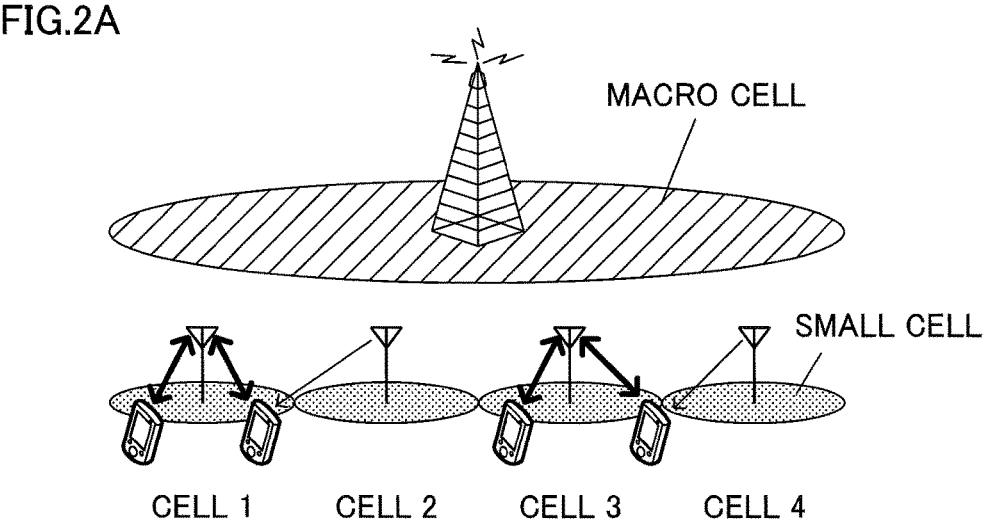
FIG. 2 provides diagrams to explain the DTX operation of small cells.

The DTX operation in the off state will be described with reference to FIG. 2 and FIG. 3. FIG. 2A illustrates a case where a plurality of small cells (in FIG. 2A, cell 1 to cell 4) are arranged within a macro cell and where the small cells are all in the on state.

In the example illustrated in FIG. 2A, user terminals are present in the small cells 1 and 3 and are communicating with the small base stations. That is, there is traffic in the small cells 1 and 3.

On the other hand, in the example illustrated in FIG. 2A, the small cells 2 and 4 have no traffic of their own. In this case, the network decides to make the small cells 2 and 4 transition to the off state (DTX state) if the coverages are secured by the macro cell. As long as the coverages are secured by the macro cell, switching off the small cells 2 and 4 does not produce coverage holes. Consequently, the network reports the small cells 2 and 4 to transition to the off state (DTX state).

Figure 2B:
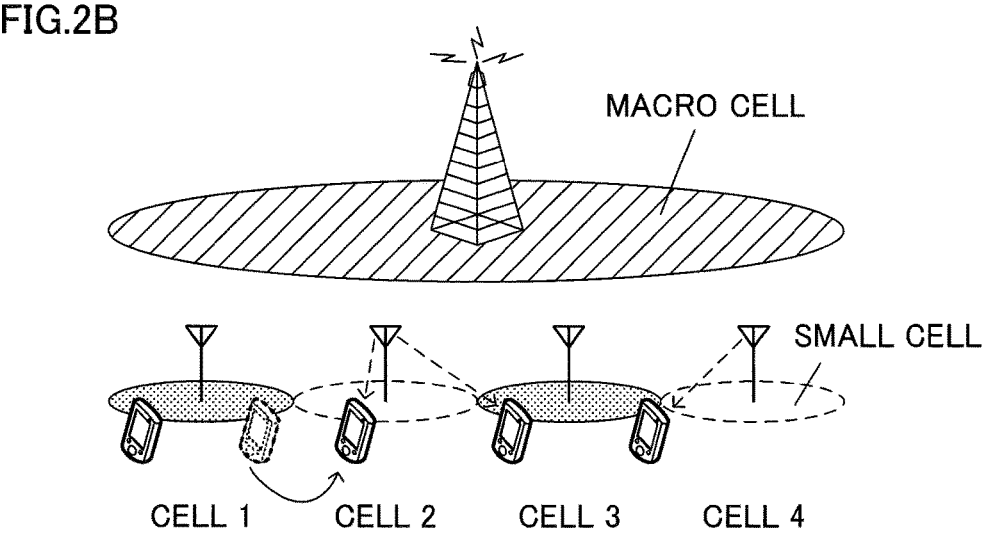

FIG. 2B illustrates an example where the small cells 2 and 4 have transitioned to the off state (DTX state). FIG. 3 illustrates an example DTX transmission pattern by small cells.

Figure 3:
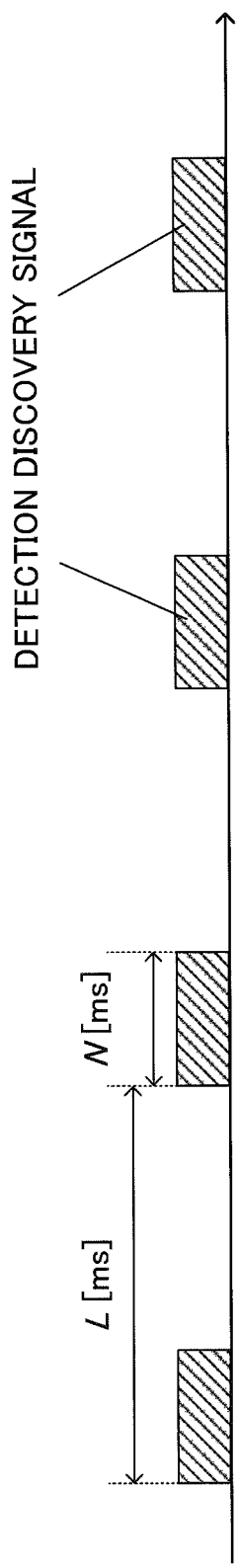
FIG. 3 is a diagram to explain the detection signal to transmit in the DTX state.

As illustrated in FIG. 3, in the DTX state, small cells transmit the detection signal (discovery signal), which is used to detect and measure these cells, discontinuously, in a long cycle. In the example illustrated in FIG. 3, the DTX transmission on interval is L [ms], and the DTX transmission on period is N [ms].

On-state small cells transmit reference signals (such as CRSs) constantly even when there is no traffic, and therefore cause interference against nearby cells, as illustrated with the thin solid arrows in the small cells 2 and 4 illustrated in FIG. 2A. By contrast with this, off-state (DTX state) small cells transmit no signals in the DTX transmission off period, and therefore can reduce the interference against nearby cells as illustrated with the bold solid arrows in the small cells illustrated in FIG. 2B.

Figure 2C:
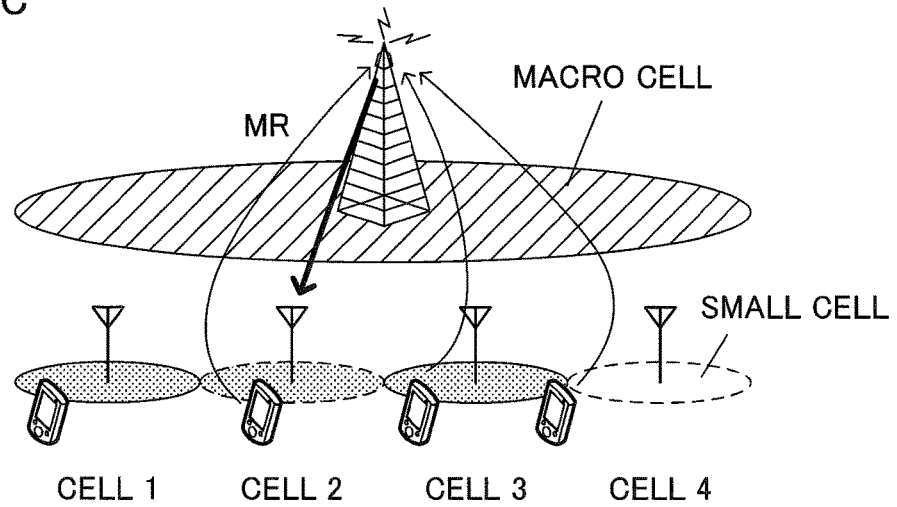

In the example illustrated in FIG. 2B, a user terminal has moved in the area of the small cell 2, which is in the DTX state. When the user terminal detects the detection signal (discovery signal) transmitted from the small cell 2 in the DTX state, the user terminal transmits a measurement report (MR) of a radio quality measurement result, to the network, as illustrated in FIG. 2C.

The network decides whether it is necessary to make the small cell 2 in the DTX state transition to the on state based on the measurement report transmitted from the user terminal. In the example illustrated in FIG. 2C, the network reports the small cell 2 to transition to the on state, and the small cell 2 transitions to the on state.

Figure 4:
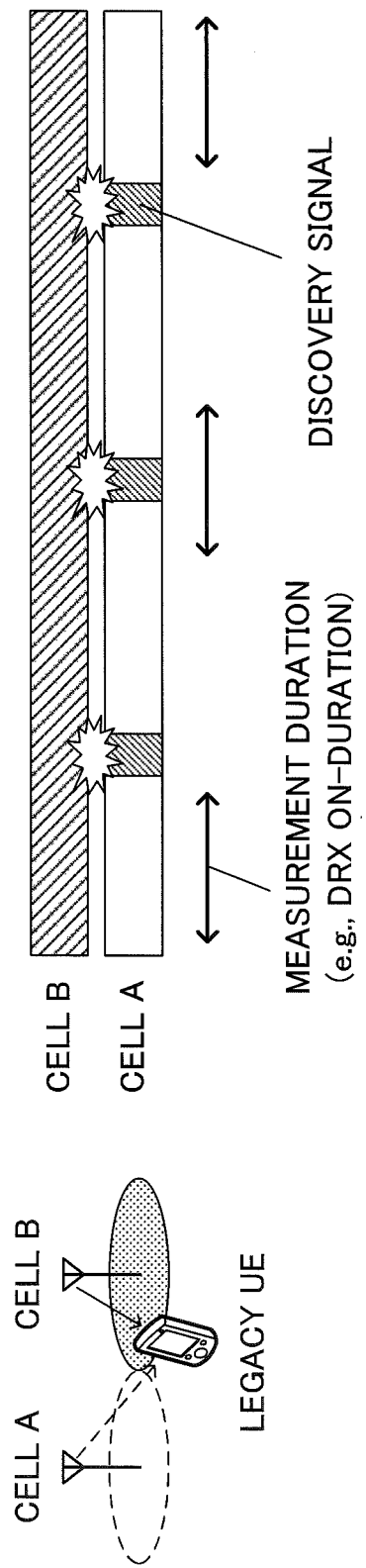
FIG. 4 is a diagram to explain a problem with conventional DTX transmission.

As illustrated in FIG. 4, cases might occur where a legacy UE, which is a user terminal of Rel. 11 or earlier versions, is present on the frequency carrier that is used in small cells that are subject to the above-described on/off control. The legacy UE does not support the DTX operation using the above-described detection signal (discovery signal).

The legacy UE carries out a cell search using the primary synchronization signal and the secondary synchronization signal (PSS/SSS), measurements using the CRS and so on. Consequently, when the detection signals (discovery signals) transmitted in DTX transmission from small cells in the DTX state collide with the PSSs/SSSs or the CRSs transmitted from nearby on-state cells, there is a threat of leaving an impact on the measurements by the legacy UE.

In the example illustrated in FIG. 4, the small cell A assumes the DTX state, and the small cell B assumes the on state. The small cell A transmits the detection signal (discovery signal) discontinuously. The small cell B transmits reference signals such as the CRS constantly. The legacy UE assumes the discontinuous reception (DRX) state, and receives downlink signals in DRX on-duration periods.

The second DRX on-duration period illustrated in FIG. 4 overlaps the small cell A's DTX transmission on period. At this time, the cell A's detection signal (discovery signal) interferes with the cell B's CRS, and therefore the legacy UE detects the received quality of the cell B as one that is deteriorated.

Interference is produced only in the cell A's DTX transmission on period, and the deterioration of received quality may not continue after that. Nevertheless, the legacy UE, having decided that the received quality has deteriorated, may carry out operations that really are unnecessary, before and until the next DRX on-duration period, such as, for example, transmitting event-triggered measurement reports, carrying out the re-connection process due to radio link failure, decreasing the transmission rate and so on.

So, the present inventors have conceived of a DTX transmission method, whereby, with respect to legacy UEs, the impact of DTX transmission can be reduced, and whereby, with respect to Rel. 12 UEs, the detection signals (discovery signals) transmitted in DTX transmission can be detected accurately.

First Example

A case will be described with a first example where, as detection signals (discovery signals) to transmit from small cells in the off state (DTX state), signals with varied transmission power are transmitted. To be more specific, a case will be described here where the transmission power of the detection signals (discovery signals) that are transmitted from small cells in the DTX state is made lower than the transmission of the downlink signals that are transmitted in the on state.

Figure 5:
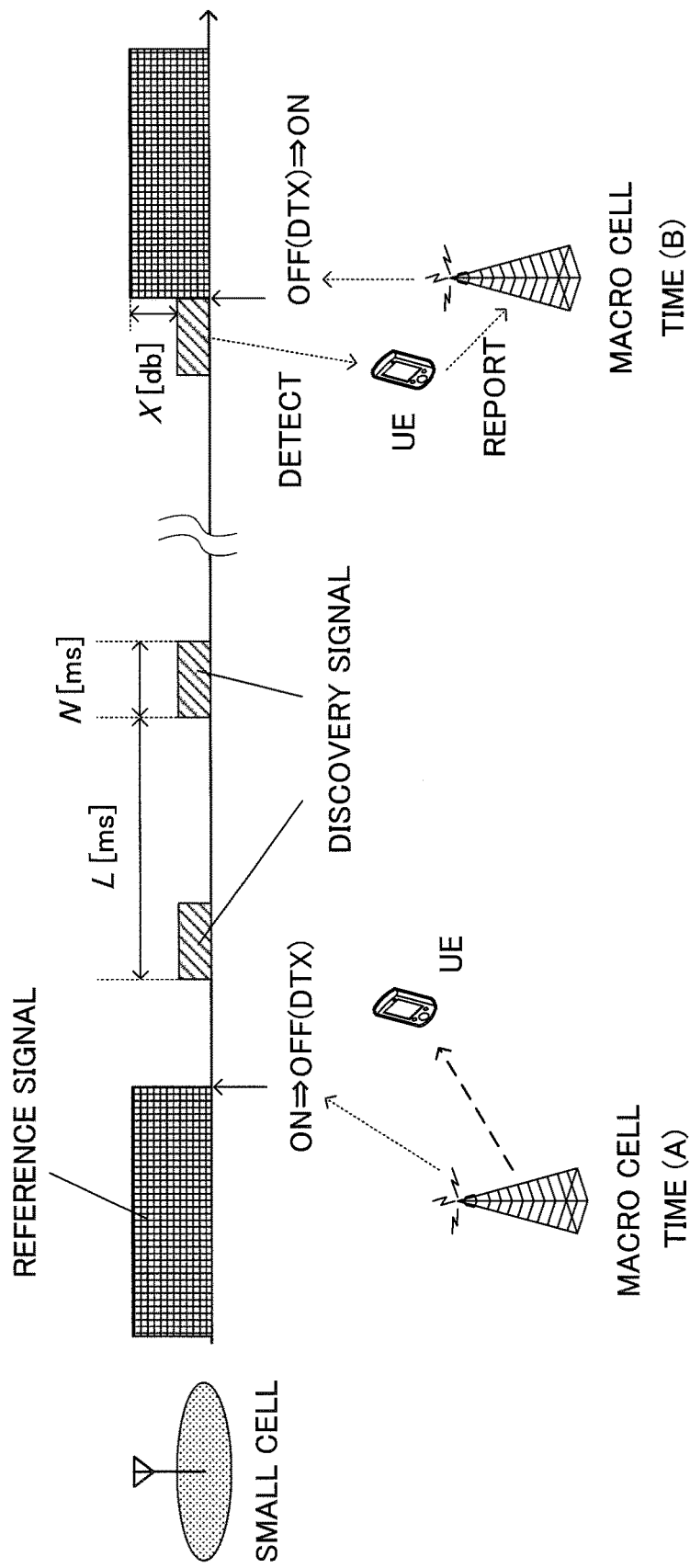
FIG. 5 is an operation chart of small cells according to a first example.

FIG. 5 is an operation chart of small cells according to the first example. As illustrated in FIG. 5, a small cell is first in the on state and transmits reference signals such as the CRS.

In the time (A) illustrated in FIG. 5, the network (macro cell) decides that there is no traffic in this small cell and reports the small cell to transition to the off state (DTX state).

The small cell, having received the report, transitions from the on state to the off state (DTX state). In the DTX state, the small cell transmits the detection signal (discovery signal) in transmission on periods N [ms], at transmission on intervals L [ms]. As illustrated in FIG. 5, the small cell transmits the detection signal (discovery signal) by lowering the transmission power by X [db] from that of the reference signals transmitted in the on state.

The transmission power of the detection signal (discovery signal) is, for example, reported from the network (macro cell) to the small cell.

At the time (A), the network (macro cell) reports DTX transmission information to a Rel. 12 UE. The DTX transmission information at least includes information regarding the transmission power of the detection signal (discovery signal). Besides, the DTX transmission information may include information about the DTX transmission cycle (transmission on interval L [ms]), the transmission time, the number of antennas ports used, the signal structure and so on. The information about the signal structure includes, for example, the DTX transmission on period N [ms].

At the time (B) in FIG. 5, the Rel. 12 UE detects the DTX detection signal (discovery signal) transmitted from the small cell, and transmits a measurement report to the network (macro cell). In this case, the Rel. 12 UE adds an offset to the received power of the detection signal (discovery signal) based on the DTX transmission information, and transmits a measurement report. Based on the measurement report transmitted from the Rel. 12 UE, the network (macro cell) reports the small cell in the DTX state to transition to the on state.

The small cell, having received the report, transitions from the DTX state to the on state. In the on state, the small cell transmits reference signals with greater transmission power than the detection signal (discovery signal) transmitted in the DTX state.

By carrying out the operations of the first example, it is possible to reduce the impact which DTX transmission has, with respect to legacy UEs. This is because the interference with nearby cells in the on state decreases by lowering the transmission power of the detection signal (discovery signal) in the DTX state.

Meanwhile, by reporting DTX transmission information, it is possible to prevent the Rel. 12 UE from missing a report regarding the small cell in the DTX state.

For example, assume that, in the example illustrated in FIG. 5, the reference signal which the small cell in the on state transmits and the detection signal (discovery signal) which is transmitted in the DTX state are the same reference signal. By using the same reference signal, it is possible to provide a Rel. 12 UE, without providing a structure which features a new function for detecting and measuring the downlink reference signal which the small cell in the DTX state alone transmits.

The Rel. 12 UE needs to detect and measure the same reference signal, as the reference signal which the small cell in the on state transmits or the detection signal (discovery signal) which the small cell in the DTX state transmits. Consequently, there is a possibility that the Rel. 12 UE makes erroneous decisions unless DTX transmission information is reported in advance. To be more specific, if the Rel. 12 UE does not know that the transmission power of the detection signal (discovery signal) which the small cell in the DTX state transmits is lowered, even if the small cell in the DTX state is present nearby, its received power is low, and there is a possibility that the Rel. 12 UE fails to send a report.

So, by reporting DTX transmission information and configuring, for example, a measurement report trigger by taking into account the transmission power of the detection signal (discovery signal) which the small cell in the DTX state transmits, it is possible to prevent the Rel. 12 UE from missing a report regarding the small cell in the DTX state.

Also, by lowering the transmission power of the detection signal (discovery signal) which the small cell in the DTX state transmits, the power that is consumed in this small cell can be reduced, so that it is possible to improve the energy saving effect.

Next, the detection signal (discovery signal) which the small cell in the DTX state transmits will be described. For the detection signal (discovery signal), it is possible to use one of, or a combination of, for example, the synchronization signals (PSS/SSS), the cell-specific reference signal (CRS), the channel information measurement reference signal (CSI-RS: Channel State Information-Reference Signal), the positioning reference signal (PRS), and new signals. The small cell in the DTX state transmits such detection signals (discovery signals) with the transmission power, transmission cycle and transmission time designated by the network (macro cell).

Figure 6A:
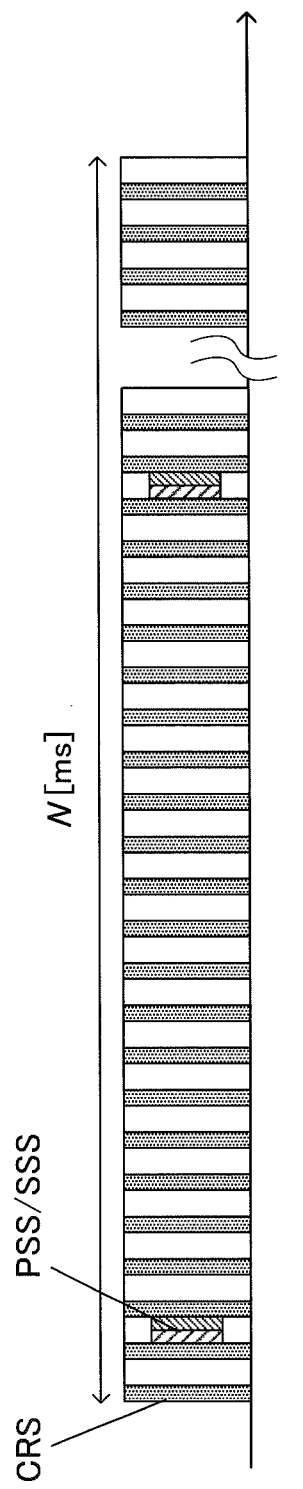
FIG. 6 provides diagrams to explain the detection signals transmitted from small cells in the DTX state.

FIG. 6A illustrates a case where the PSS/SSS and CRS are transmitted as detection signals (discovery signals). In the example illustrated in FIG. 6A, the CRS is arranged to be distributed in a subframe, and transmitted on a per subframe basis. The PSS/SSS are arranged in a bandwidth to occupy six RBs in the center, and transmitted every five [ms].

Receiving these detection signals (discovery signals), the Rel. 12 UE detects the cell ID and transmission time of the small cell in the DTX state, by using the PSS/SSS. Also, using the CRS, the Rel. 12 UE corrects time, measures received quality (RSRP: Reference Signal Received Power), and transmits a measurement report.

In this way, when the Rel. 12 UE detects and measures the detection signal (discovery signal), it is possible to appropriate the cell identification and measurement mechanism of the legacy UE on an as-is basis.

Figure 6B:
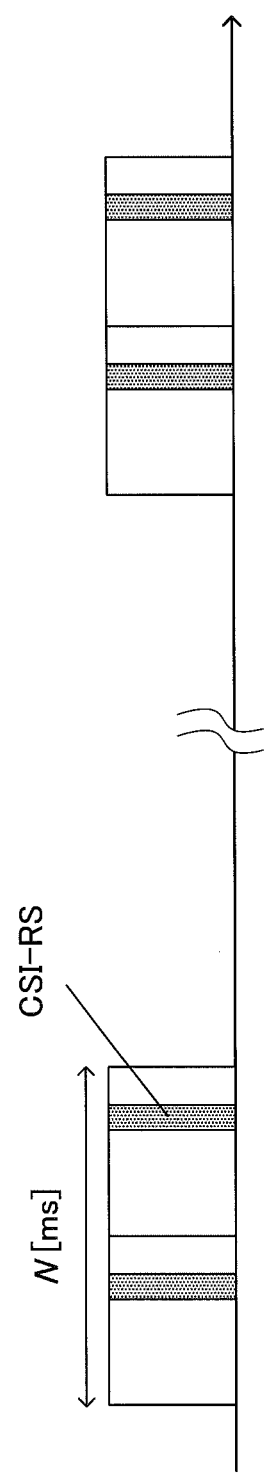

FIG. 6B illustrates a case where the CSI-RS is transmitted as a detection signal (discovery signal). Receiving this detection signal (discovery signal), the Rel. 12 UE detects the cell ID and transmission time of the small cell in the DTX state, and, furthermore, measures the RSRP, by using the CSI-RS.

When small cells are in an environment in which inter-cell time synchronization is established, it is possible to cancel the interference between the cells by using the zero-power CSI-RS (ZP-CSI-RS), so that highly accurate detection measurements are made possible even in short-term transmission where N=1 in the DTX transmission on period N [ms].

Also, in existing specifications, the CSI-RS already supports long-cycle transmissions up to a transmission cycle of 80 [ms]. Consequently, it is possible to configure the DTX transmission on interval L [ms] flexibly.

As described above, with the radio communication method according to the first example, when small cells are switched on and off dynamically, signals with varied transmission power are transmitted as detection signals (discovery signals) to transmit from small cells in the off state (DTX state), so that user terminal can efficiently detect the small cells in the off state (DTX state).

Second Example

A case will be described with a second example where, as in the first example, signals with carried transmission power are transmitted as detection signal (discovery signal) to be transmitted from small cells in the off state (DTX state). To be more specific, a case will be described here where the transmission power of the detection signal (discovery signal) which a small cell in the DTX state transmits is first made lower than the transmission power of the downlink signals transmitted in the on state, and then increased stepwise.

Figure 7:
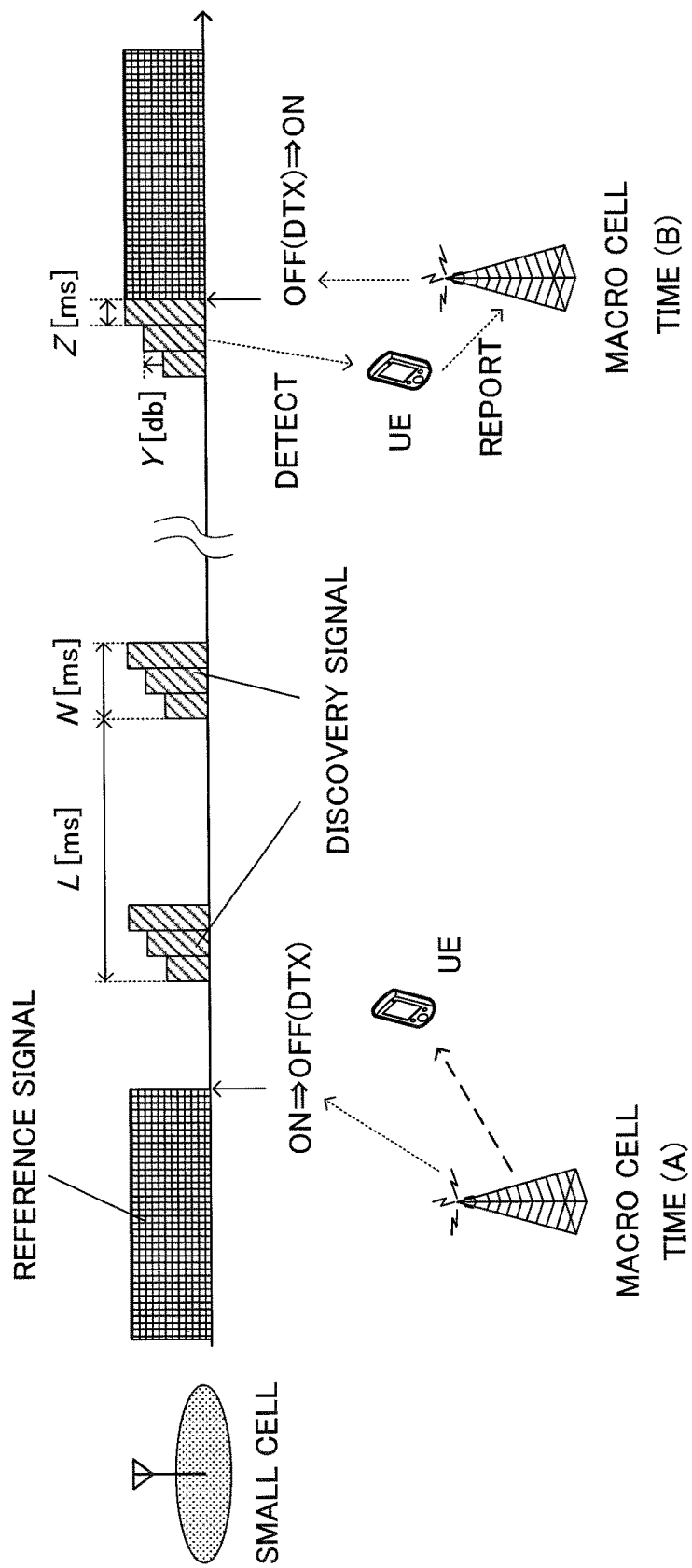
FIG. 7 is an operation chart of small cells according to a second example.

FIG. 7 is an operation chart of small cells according to the second example. As illustrated in FIG. 7, in the second example, the detection signal (discovery signal) which a small cell in the DTX state transmits assumes a different structure from that of the first example. Note that configurations and operations in the second example that are common to those of the first example will not be described again.

In the second example, a small cell in the DTX state transmits the detection signal (discovery signal) in transmission on periods N [ms], at transmission on intervals L [ms]. The transmission power of this detection signal (discovery signal) increases stepwise, in transmission on periods N [ms], by Y [db] at a time, per cycle of change Z [ms].

The stepwise changes of the detection signal (discovery signal) are made possible by, for example, reporting the amount of increase Y [db] upon power changes, the cycle of change Z [ms] and so on, from the network (macro cell) to the small cell.

The stepwise changes of the detection signal (discovery signal) may also be realized by reporting a fixed change pattern from the network (macro cell) to the small cell and repeating this pattern in the small cell. Furthermore, this may also be realized by reporting the absolute value of transmission power in each step from the network (macro cell) to the small cell. Alternatively, it is equally possible to report the stepwise changes of detection signals (discovery signal) per cell to user terminals, via the network (macro cell).

At the time (A) illustrated in FIG. 7, the network (macro cell) reports DTX transmission information to a Rel. 12 UE. The DTX transmission information at least includes information about the amount of increase Y [db] upon power changes and the cycle of change Z [ms]. Besides, the DTX transmission information may also include information about the DTX transmission cycle (transmission on interval L [ms]), the transmission time, the number of antennas ports used, the signal structure and so on. Also, instead of the amount of increase upon power changes, the DTX transmission information may include information about the absolute value of transmission power in each step as well.

By carrying out the operations of the second example, it is possible to reduce the impact which DTX transmission has, with respect to legacy UEs, and, since the transmission power of the detection signal (discovery signal) increases stepwise, it is possible to assume operations that take into account, smoothly, the impact of small cells to transition from the DTX state to the on state.

Meanwhile, by reporting DTX transmission information, it is possible to prevent the Rel. 12 UE from missing a report regarding the small cell in the DTX state, and, provided that the transmission power of the detection signal (discovery signal) increases stepwise, it is possible to improve the accuracy of detection and measurements with respect to this signal.

As described above, with the radio communication method according to the second example, when small cells are switched on and off dynamically, signals with transmission power that is made low first and then increases stepwise are transmitted as detection signals (discovery signals) to transmit from small cells in the off state (DTX state), so that user terminal can efficiently detect the small cells in the off state (DTX state).

(Structure of Radio Communication System)

Now, a structure of a radio communication system according to the present embodiment will be described below. In this radio communication system, the radio communication methods according to the above first example and the second examples are employed.

Figure 8:
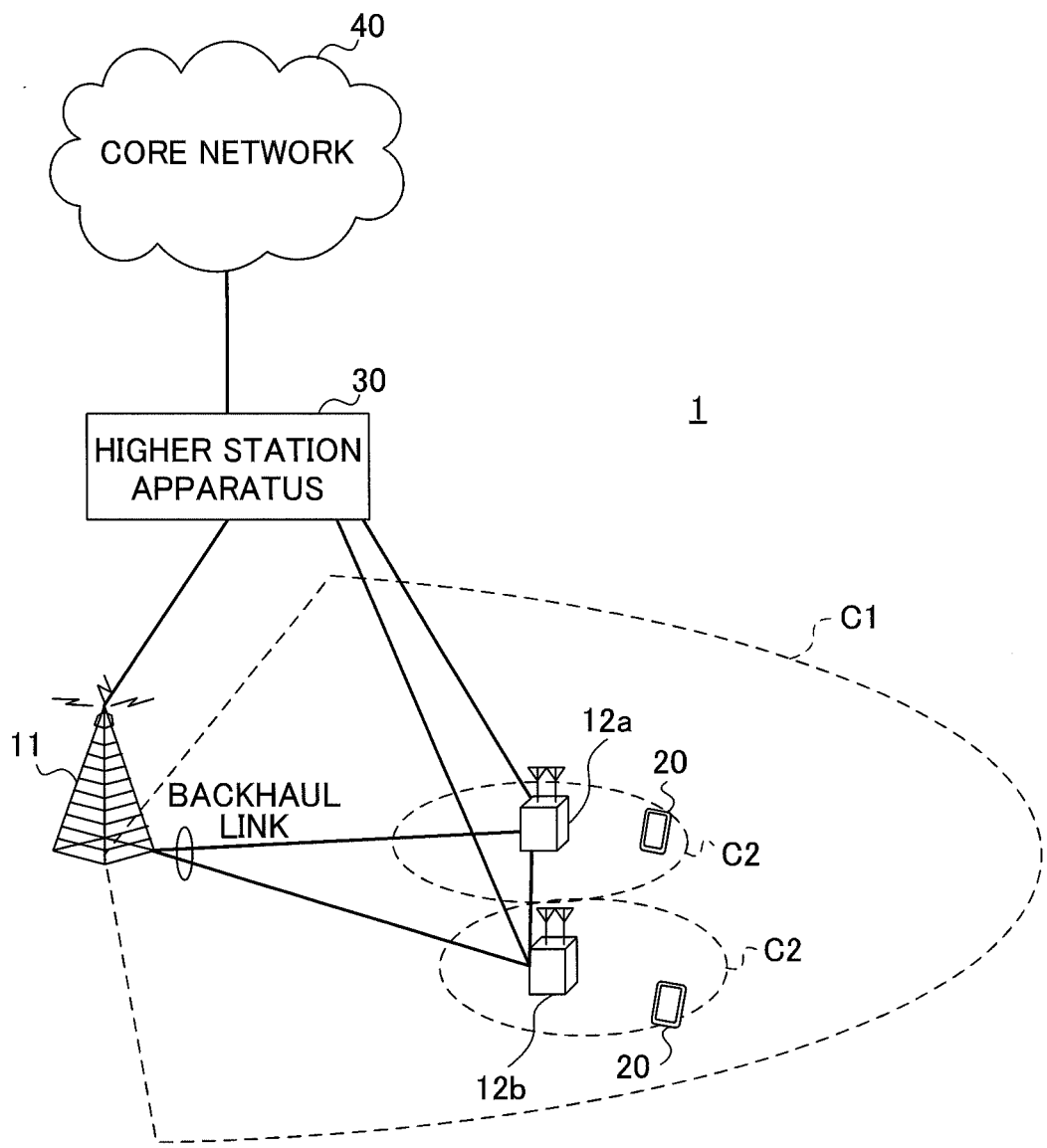
FIG. 8 is a schematic diagram to illustrate an example of a radio communication system according to the present embodiment.

FIG. 8 is a schematic configuration diagram of the radio communication system according to the present embodiment. As illustrated in FIG. 8, the radio communication system 1 includes a macro base station 11, which forms a macro cell C1, and small base stations 12a and 12b, which are placed in the macro cell C1 and which form small cells C2 that are narrower than the macro cell C1. The user terminals 20 are structured to be capable of carrying out radio communication with the macro base station 11 and at least one of the small base stations 12a and 12b (hereinafter collectively referred to as "small base stations 12"). Note that the number of the macro base station 11 and the small base stations 12 is by no means limited to the number illustrated in FIG. 8.

In the macro cell C1 and the small cells C2, the same frequency band may be used, or different frequency bands may be used. Also, the macro base station 11 and each small base station 12 are connected with each other via an inter-base station interface (for example, optical fiber, X2 interface, etc.). The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "HeNBs (Home eNodeBs)," "transmission points," "eNodeBs (eNBs)" and so on. The user terminals 20 are terminals to support various communication schemes such as LTE and LTE-A, and may not only be mobile communication terminals, but may also include fixed communication terminals as well.

The radio communication system 1 assumes cases where the networks that are formed per macro cell are asynchronous (asynchronous operation). Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

Also, in the radio communication system 1, a downlink shared channel (PDSCH: Physical Downlink Shared Channel), which is used by each user terminal 20 on a shared basis, a downlink control channel (PDCCH: Physical Downlink Control Channel), an EPDCCH (Enhanced Physical Downlink Control Channel), a PCFICH (Physical Control Format Indicator Channel), a PHICH (Physical Hybrid-ARQ Indicator Channel), a broadcast channel (PBCH: Physical Broadcast Channel) and so on are used as downlink communication channels. User data and higher layer control information are transmitted by the PDSCH. Downlink control information (DCI) is transmitted by the PDCCH and the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink communication channels. User data and higher layer control information are transmitted by the PUSCH. Also, by means of the PUCCH, downlink radio quality information (CQI: Channel Quality Indicator), delivery acknowledgement information (ACKs/NACKs) and so on are transmitted.

Hereinafter, the macro base station 11 and the small base stations 12 will be collectively referred to as "radio base station 10," unless distinction needs to be drawn otherwise.

Figure 9:
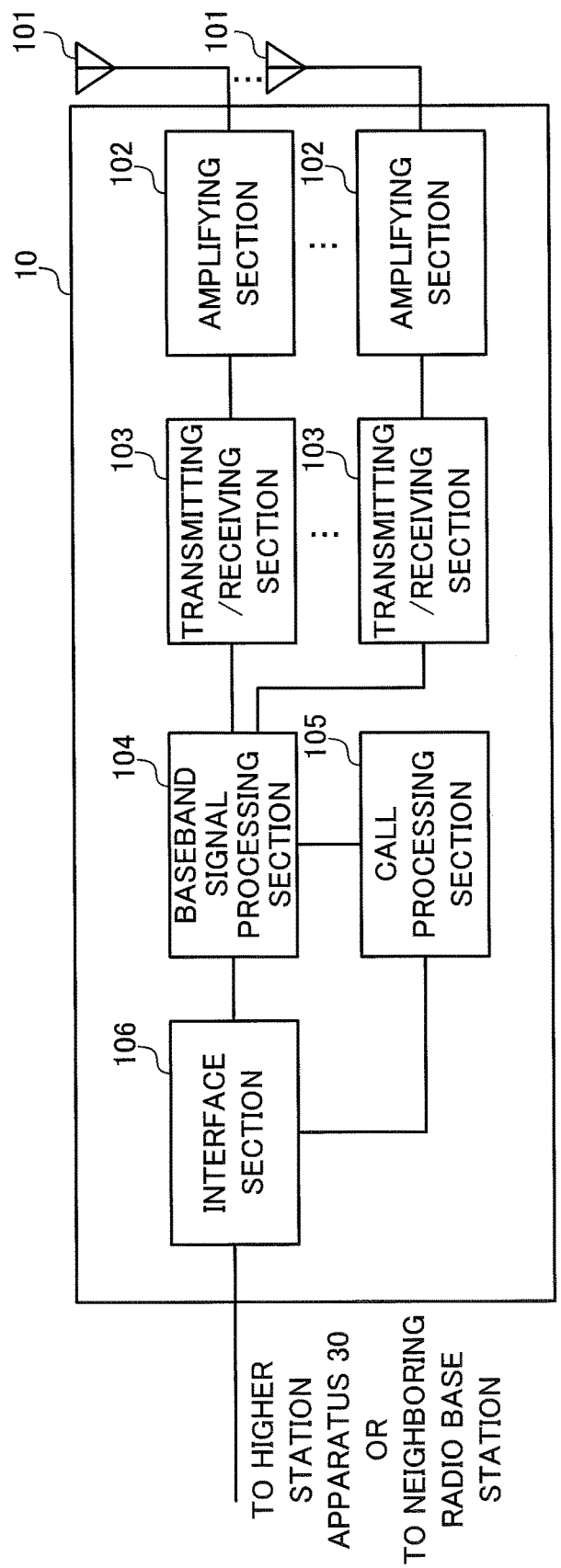
FIG. 9 is a diagram to explain an overall structure of a radio base station according to the present embodiment.

FIG. 9 is a diagram to illustrate an overall structure of a radio base station 10 according to the present embodiment. The radio base station 10 has a plurality of transmitting/receiving antennas 101 for MIMO transmission, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control signals are also subjected to transmission processes such as channel coding and an inverse fast Fourier transform, and transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and transferred to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, X2 interface, etc.). Alternatively, the interface section 106 transmits and receives signals to and from the higher station apparatus 30 via a predetermined interface.

Figure 10:
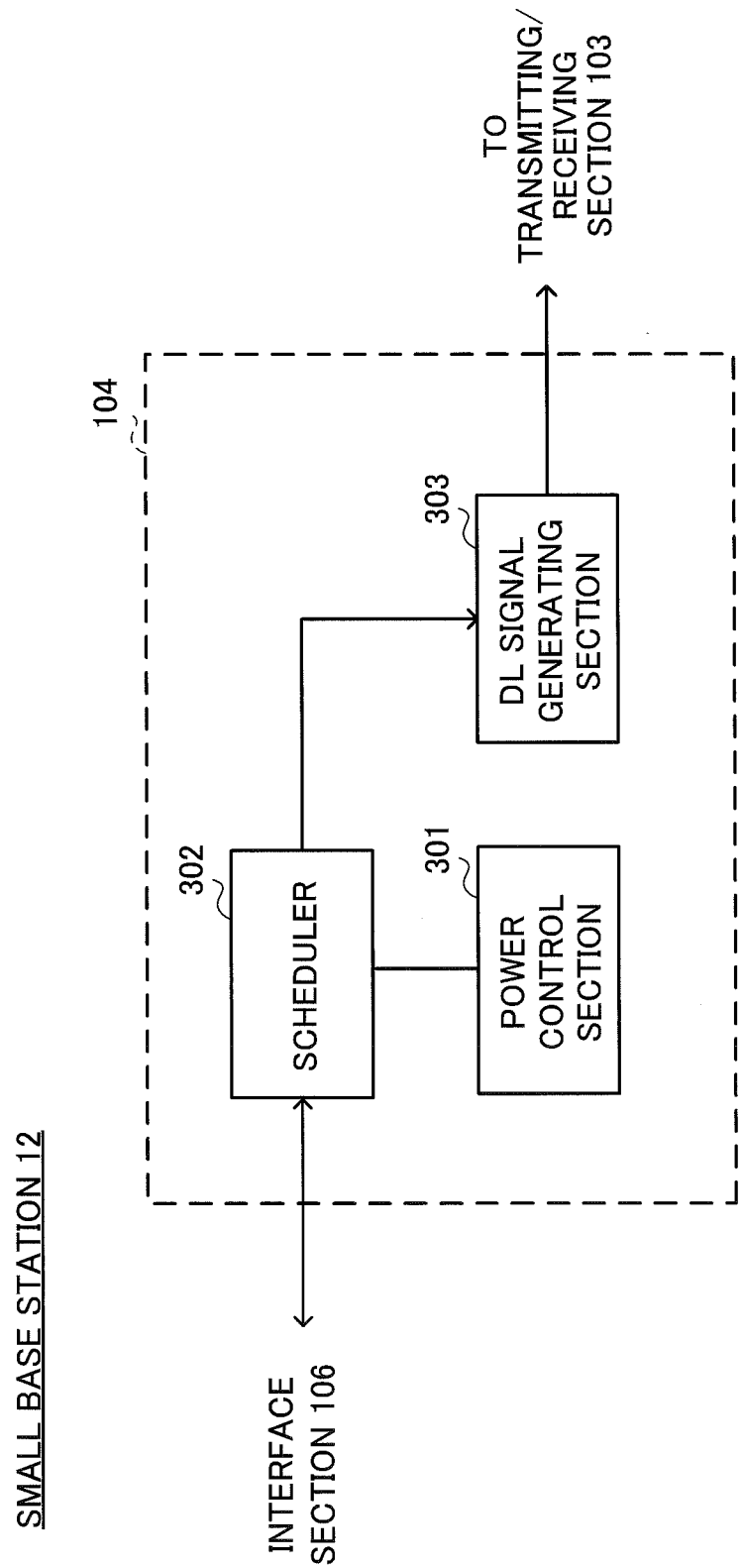
FIG. 10 is a diagram to explain a functional structure of a small base station according to the present embodiment.

FIG. 10 is a diagram to illustrate a functional structure of a radio base station 12 (small base station) according to the present embodiment. Note that the following functional structure is formed with the baseband signal processing section 104 provided in the radio base station 12 and so on.

As illustrated in the FIG. 10, the radio base station 12 has a power control section 301, a scheduler 302 and a DL signal generating section 303.

The power control section 301 transmits and receives signals to and from the macro cell via the interface section 106 (backhaul signaling). When the small base station 12 receives a report commanding a transition to the off state (DTX state) from the macro cell, the power control section 301 carries out power control, based on the report from the macro cell, so that the transmission power of the detection signal (discovery signal) transmitted in the DTX state is lower than the transmission power of the reference signals transmitted in the on state. Also, the power control section 301 carries out power control, based on the report from the macro cell, so that the transmission power of the detection signal (discovery signal) that is transmitted in the DTX state increases stepwise in transmission on periods.

The scheduler 302 allocates radio resources for DL signals to transmit to the user terminal 20 (scheduling). For example, when the detection signal (discovery signal) is transmitted to the user terminal 20, the detection signal is controlled to be transmitted in a predetermined period.

The DL signal generating section 303 generates DL signals based on commands from the scheduler 302. For example, the DL signal generating section 303 generates control signals, data signals, reference signals and so on. Also, the DL signal generating section 303 generates the detection signal (discovery signal) for allowing the user terminal 20 to discover the small base station. The signals generated in the DL signal generating section 303 are transmitted to the user terminal 20 and the radio base stations of other cells via the transmitting/receiving sections 103.

Figure 11:
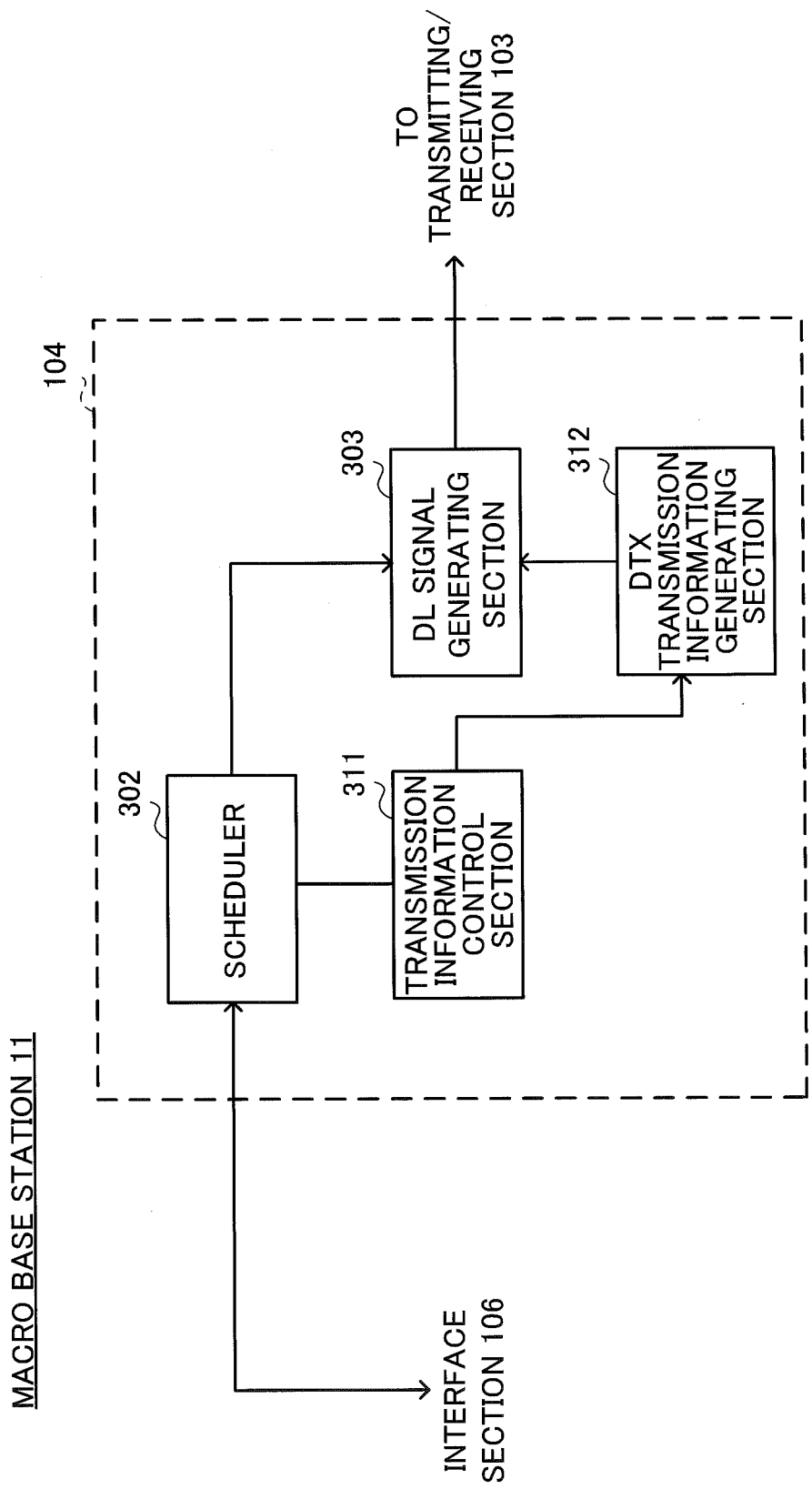
FIG. 11 is a diagram to explain a functional structure of a macro base station according to the present embodiment.

FIG. 11 is a diagram to illustrate a functional structure of a radio base station 11 (macro base station) according to the present embodiment. Note that the following functional structure is formed with the baseband signal processing section 104 provided in the radio base station 11 and so on.

As illustrated in FIG. 11, the radio base station 11 has a transmission information control section 311, a DTX transmission information generating section 312, a scheduler 302 and a DL signal generating section 303.

The transmission information control section 311 transmits and receives signals to and from small base stations 12 via the interface section 106 (backhaul signaling). The transmission information control section 311 monitors the traffic in each small cell, and controls those small cells that are decided to carry no traffic to transition from the on state to the off state (DTX state). Also, the transmission information control section 311 controls those small cells that are decided to carry traffic based on, for example, measurement reports transmitted from user terminals, to transition from the DTX state to the on state.

The DTX transmission information generating section 312 generates information about the transmission power of the detection signal (discovery signal), which is reported to small cells that transition from the on state to the DTX state. Also, the DTX transmission information generating section 312 generates information about such transmission power of the detection signal (discovery signal) that increases stepwise in DTX state transmission on periods.

Also, the DTX transmission information generating section 312 generates DTX transmission information (discontinuous transmission information) to report to the user terminal 20. The DTX transmission information includes, for example, information about the transmission power of the detection signal (discovery signal). Alternatively, the detection signal (discovery signal) may include information about the amount of increase of transmission power when the power of the detection signal (discovery signal) increases stepwise in transmission on period and the cycle of change.

Figure 12:
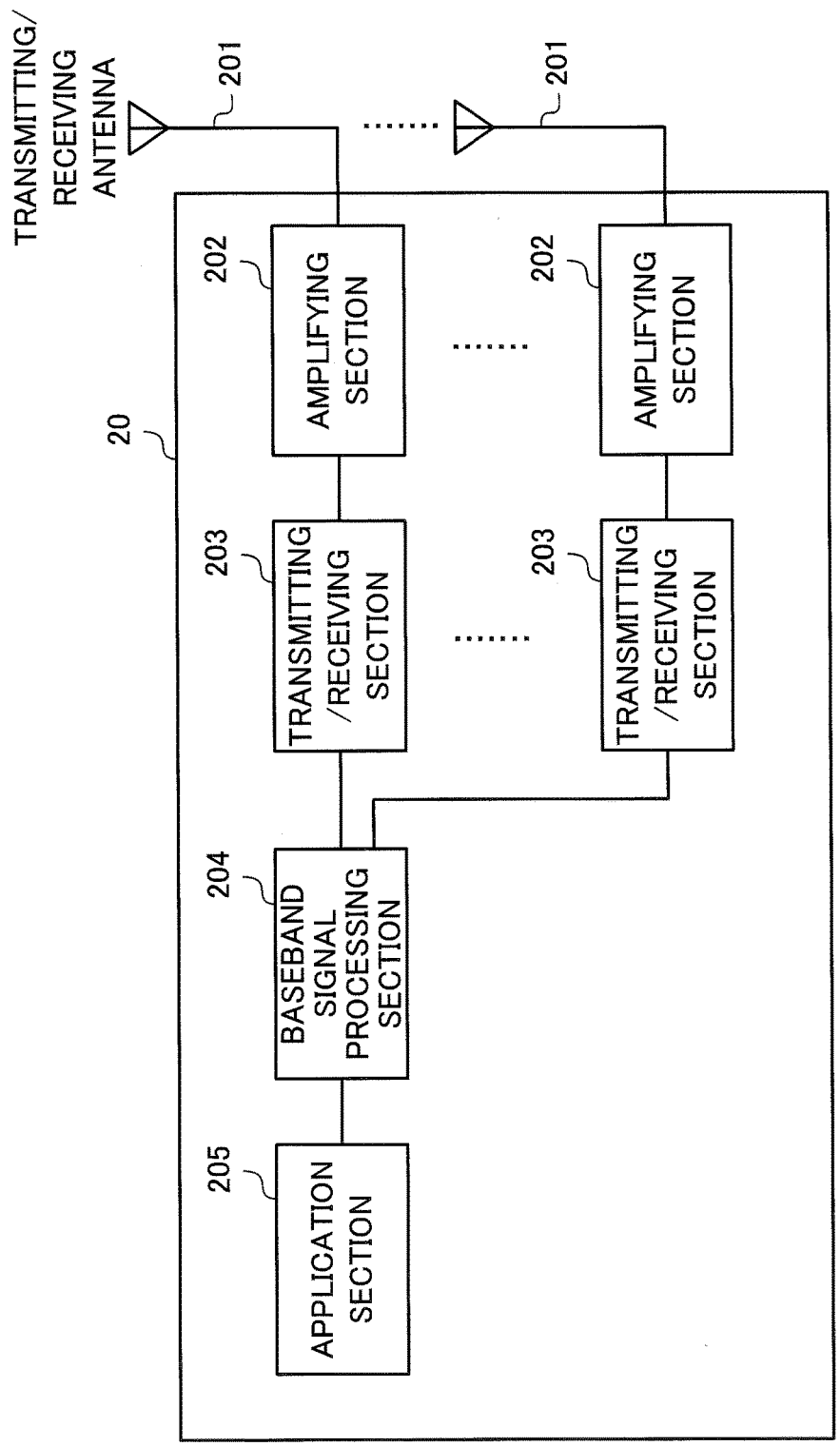
FIG. 12 is a diagram to explain an overall structure of a user terminal according to the present embodiment.

FIG. 12 is a diagram to illustrate an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 13:
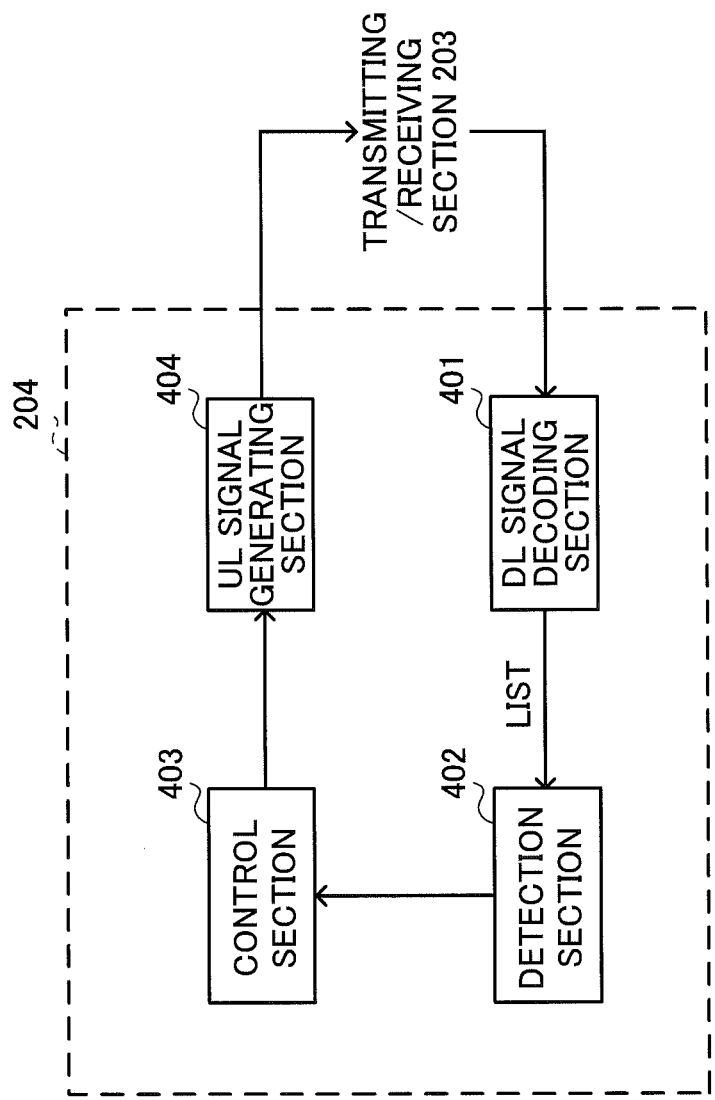
FIG. 13 is a diagram to explain a functional structure of a user terminal according to the present embodiment.

FIG. 13 is a diagram to illustrate a principle functional structure of the baseband signal processing section 204 provided in the user terminal 20. As illustrated in FIG. 13, the baseband signal processing section 204 provided in the user terminal 20 is comprised at least of a DL signal decoding section 401, a detection section 402, a control section 403 and a UL signal generating section 404.

The DL signal decoding section 401 decodes the DL signals transmitted from the radio base stations 11 and 12. For example, when DTX transmission information is transmitted from the macro base station 11, this information is output to the detection section 402.

The detection section 402 detects and measures the small base stations based on the detection signals (discovery signals) transmitted from the small base stations 12.

The control section 403 controls the allocation of uplink control signals (feedback signals) and uplink data signals to radio resources based on downlink control signals (uplink grant) transmitted from the radio base stations. The UL signal generating section 404 generates uplink control signals (feedback signals such as delivery acknowledgement signals, channel state information (CSI) and so on) based on commands from the control section 403. Also, the UL signal generating section 404 generates uplink data signals based on commands from the control section 403.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way. For example, the examples described above may be combined and implemented as appropriate.

The disclosure of Japanese Patent Application No. 2013-161010, filed on Aug. 2, 2013, including the specification, drawings and abstract, is incorporated herein by reference in its entirety.

The invention claimed is:

1. A radio base station that switches between a continuous transmission state and a discontinuous transmission state dynamically, the radio base station comprising:
a transmitter that transmits a reference signal; and
a processor that executes power control so that transmission power of the reference signal for cell detection that is transmitted in the discontinuous transmission state is lower than transmission power of the reference signal that is transmitted in the continuous transmission state, wherein
the reference signal for cell detection that is transmitted in the discontinuous transmission state is one of, or a combination of, a synchronization signal (PSS/SSS), a cell-specific reference signal (CRS), a channel information measurement reference signal (CSI-RS: Channel State Information-Reference Signal), and a positioning reference signal (PRS).

2. The radio base station according to claim 1, wherein the processor executes power control so that the transmission power of the reference signal for cell detection that is transmitted in the discontinuous transmission state increases stepwise in a transmission on period.

3. The radio base station according to claim 2, wherein the processor executes stepwise power control with respect to the transmission power of the reference signal for cell detection, based on an amount of increase upon a power change and a change cycle, which are reported from a network.

4. The radio base station according to claim 2, wherein the processor executes stepwise power control with respect to the transmission power of the reference signal for cell detection in accordance with a fixed change pattern reported from a network.

5. The radio base station according to claim 2, wherein the processor executes stepwise power control with respect to the transmission power of the reference signal for cell detection based on an absolute value of the transmission power in each step, which is reported from a network.

6. A user terminal that is capable of receiving downlink signals from a macro base station and a plurality of small base stations that serve under the macro base station, the user terminal comprising:
a receiver that receives discontinuous transmission information for a small base stations serving under the macro base station from one or both of the macro base station and the small base station; and
a processor that detects a reference signal for cell detection that is transmitted from the small base station in a discontinuous transmission state, based on the discontinuous transmission information acquired, wherein
the reference signal for cell detection that is transmitted in the discontinuous transmission state is one of, or a combination of, a synchronization signal (PSS/SSS), a cell-specific reference signal (CRS), a channel information measurement reference signal (CSI-RS: Channel State Information-Reference Signal), and a positioning reference signal (PRS).

7. The user terminal according to claim 6, wherein the discontinuous transmission information includes information related to transmission power of the reference signal for cell detection.

8. The user terminal according to claim 6, wherein the discontinuous transmission information includes information related to an amount of increase of transmission power and a cycle of change when power of the reference signal for cell detection increases stepwise in a transmission on period.

9. A radio communication method for a radio base station that switches between a continuous transmission state and a discontinuous transmission state dynamically, the radio communication method comprising:
executing power control so that transmission power of a reference signal for cell detection that is transmitted in the discontinuous transmission state is lower than transmission power of a reference signal that is transmitted in the continuous transmission state, wherein
the reference signal for cell detection that is transmitted in the discontinuous transmission state is one of, or a combination of, a synchronization signal (PSS/SSS), a cell-specific reference signal (CRS), a channel information measurement reference signal (CSI-RS: Channel State Information-Reference Signal), and a positioning reference signal (PRS).

* * * * *